(12) United States Patent
Itagaki et al.

(10) Patent No.: US 10,272,898 B2
(45) Date of Patent: Apr. 30, 2019

(54) CONTROLLER FOR HYBRID VEHICLE

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP); Koichi Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 54 days.

(21) Appl. No.: 15/637,061

(22) Filed: Jun. 29, 2017

(65) Prior Publication Data

US 2018/0001884 A1 Jan. 4, 2018

(30) Foreign Application Priority Data

Jul. 1, 2016 (JP) .................................. 2016-131773

(51) Int. Cl.
*B60W 30/18* (2012.01)
*B60W 10/08* (2006.01)
(Continued)

(52) U.S. Cl.
CPC .............. *B60W 10/08* (2013.01); *B60K 6/383* (2013.01); *B60K 6/442* (2013.01); *B60K 6/445* (2013.01); *B60W 10/02* (2013.01); *B60W 20/15* (2016.01); *B60W 20/40* (2013.01); *B60W 30/188* (2013.01); *B60W 30/18072* (2013.01); *F16H 3/728* (2013.01); *B60K 6/365* (2013.01); *B60W 10/06* (2013.01); *B60W 2510/0647* (2013.01); *F16H 3/724* (2013.01); *Y02T 10/6239* (2013.01); *Y02T 10/7258* (2013.01)

(58) Field of Classification Search
CPC ...... B60W 10/02; B60W 10/06; B60W 10/08; B60W 2510/0647; B60W 30/18072
See application file for complete search history.

(56) References Cited

U.S. PATENT DOCUMENTS 8,267,231 B2 * 9/2012 Holmes .................... B60K 6/50
192/43.1
9,783,192 B2 * 10/2017 Shibata .................. B60K 6/383
(Continued)

FOREIGN PATENT DOCUMENTS

JP 2015-205638 A 11/2015
JP 2015-209054 A 11/2015

*Primary Examiner* — David R Morris
(74) *Attorney, Agent, or Firm* — Hunton Andrews Kurth LLP (57) ABSTRACT

A controller for a hybrid vehicle is provided. The hybrid vehicle includes an engine, a first electric motor, a second electric motor, a power split mechanism, and a selectable one-way clutch. The hybrid vehicle is configured to increase and transmit a rotation speed of the engine to an output shaft to drive the output shaft in an overdrive state when the selectable one-way clutch is in the engaged state. The controller includes an electronic control unit configured to control the first electric motor such that an engine brake equivalent torque with a magnitude sufficient to maintain the locked state of the selectable one-way clutch is output in a direction opposite to a direction of a negative torque which is generated in the engine when the hybrid vehicle travels in a state in which supply of fuel to the engine is stopped in the overdrive state.

6 Claims, 6 Drawing Sheets

(51) Int. Cl.

| | |
|---|---|
| *B60K 6/36* | (2007.10) |
| *B60K 6/383* | (2007.10) |
| *B60K 6/442* | (2007.10) |
| *B60W 10/02* | (2006.01) |
| *B60W 20/40* | (2016.01) |
| *B60W 30/188* | (2012.01) |
| *B60K 6/445* | (2007.10) |
| *F16H 3/72* | (2006.01) |
| *B60W 20/15* | (2016.01) |
| *B60W 10/06* | (2006.01) |
| *B60K 6/365* | (2007.10) |

(56) References Cited

U.S. PATENT DOCUMENTS

| | | | | |
|---|---|---|---|---|
| 9,884,614 | B2* | 2/2018 | Shibata | B60K 6/383 |
| 9,951,829 | B2* | 4/2018 | Shibata | F16D 48/06 |
| 2009/0084653 | A1* | 4/2009 | Holmes | B60K 6/50 |
| | | | | 192/41 A |
| 2015/0298704 | A1* | 10/2015 | Itagaki | B60K 6/445 |
| | | | | 701/22 |
| 2017/0043759 | A1* | 2/2017 | Shibata | B60K 6/383 |
| 2017/0050636 | A1 | 2/2017 | Shibata et al. | |
| 2017/0097055 | A1* | 4/2017 | Shibata | F16D 48/06 |
| 2017/0113676 | A1* | 4/2017 | Shibata | B60K 6/383 |
| 2018/0015917 | A1* | 1/2018 | Itagaki | F02B 63/04 |

\* cited by examiner

CONTROLLER FOR HYBRID VEHICLE

INCORPORATION BY REFERENCE

The disclosure of Japanese Patent Application No. 2016-131773 filed on Jul. 1, 2016 including the specification, drawings and abstract is incorporated herein by reference in its entirety.

BACKGROUND

1. Technical Field

The present disclosure relates to a controller for a hybrid vehicle.

2. Description of Related Art

In the related art, a configuration in which a planetary gear and a selectable one-way clutch (SOWC) are combined is known as a hybrid system for a vehicle. The SOWC is a clutch that can selectively switch between an engaged state in which rotation in only one predetermined direction is permitted and a disengaged state in which rotation in both directions is permitted. In the engaged state of the SOWC, the rotation in one direction in which rotation is permitted is in an unlocked state and the rotation in the opposite direction to the one direction in which rotation is not permitted is in a locked state.

Japanese Patent Application Publication No. 2015-209054 (JP 2015-209054 A) describes a power train which can be driven in a so-called overdrive mode (OD mode) in which a rotation speed higher than an engine rotation speed is transmitted to an output shaft by switching the SOWC to the engaged state. According to the technique described in JP 2015-209054 A, since a first electric motor along with a ring gear of a planetary gear mechanism is fixed to set the first electric motor to a shutdown state in the OD mode, it is possible to reduce consumption of fuel which is used to drive the first electric motor and to improve fuel efficiency in high-speed driving.

As a technique for improving the fuel efficiency of a vehicle, a technique of driving a vehicle in a fuel-cut state in which supply of fuel to an engine is stopped when an accelerator is turned off is known. In the fuel-cut state, a rotational motion of the engine serves as a load for the vehicle and a negative torque is generated, and thus a so-called engine brake acts on the vehicle.

SUMMARY

When a vehicle is in the overdrive mode and the SOWC is in the engaged state, the locked state of the SOWC is maintained because a positive torque output from the engine acts in a direction in which rotation is not permitted. On the other hand, in a state in which an engine brake acts on the vehicle, a negative torque is generated in the engine and the negative torque acts on the SOWC in the engaged state in a direction in which rotation is permitted. Accordingly, in the state in which the engine brake acts, it is difficult to maintain the locked state of the SOWC.

When an operation of turning on and off an accelerator pedal is performed by a driver over a short time in this state, fuel cut and fuel supply are repeatedly carried out and thus the locked state and the unlocked state of the SOWC occurs alternately over a short time. Accordingly, there is a possibility that a driver will feel discomfort based on an engagement delay or a busy feeling.

The present disclosure provides a controller for a hybrid vehicle that can maintain a selectable one-way clutch in a locked state and prevent a driver from feeling discomfort based on an engagement delay or a busy feeling even when an engine of the vehicle in an overdrive mode does not output a positive torque.

According to an aspect of the present disclosure, there is provided a controller for a hybrid vehicle. The hybrid vehicle includes an engine, a first electric motor, a second electric motor, a power split mechanism, and a selectable one-way clutch. The second electric motor is disposed on an axis different from that of the engine. The second electric motor is connected to an output shaft of driving wheels of the hybrid vehicle to output a power to the output shaft. The power split mechanism includes a carrier, a ring gear, and a sun gear. The carrier is connected to the engine. The sun gear is connected to the first electric motor. The ring gear is connected to the output shaft to output a torque to the output shaft. The power split mechanism is configured to split a power output from the engine to the first electric motor side and the output shaft side. The selectable one-way clutch is configured to selectively switch between an engaged state in which an unlocked state in which rotation in a predetermined one direction is permitted and a locked state in which rotation in the opposite direction to the predetermined one direction is prohibited occur and a disengaged state in which rotation in the predetermined one direction and the opposite direction are permitted. The selectable one-way clutch is disposed to be connected to a power transmission path between the first electric motor and the carrier or between the first electric motor and a fixed portion. The hybrid vehicle is configured to increase and transmit a rotation speed of the engine to the output shaft to drive the output shaft in an overdrive state when the selectable one-way clutch is in the engaged state. The controller includes an electronic control unit configured to control the first electric motor such that an engine brake equivalent torque with a magnitude sufficient to maintain the locked state of the selectable one-way clutch is output in a direction opposite to a direction of a negative torque which is generated in the engine when the hybrid vehicle travels in a state in which supply of fuel to the engine is stopped in the overdrive state. According to the controller of this aspect, even when the engine does not output a positive torque, the selectable one-way clutch can be maintained in the locked state using the first electric motor and it is thus possible to prevent a driver from feeling discomfort due to an engagement delay or a busy feeling.

In the controller according to the aspect, the electronic control unit may be configured to perform at least one of control of increasing a magnitude of a positive torque output from the first electric motor and control of increasing a magnitude of a negative torque output from the second electric motor such that a magnitude of an engine brake torque generated in the output shaft in the state in which the supply of fuel to the engine is stopped is adjusted to a desired brake torque. The desired brake torque may be a torque which is greater than the magnitude of the engine brake torque output from the output shaft by a friction torque which is output from the engine in the state in which the supply of fuel to the engine is stopped.

According to the controller of this aspect, since the magnitude of the engine brake torque output from the output shaft can be increased, it is possible to adjust the engine brake torque output from the output shaft to a desired magnitude even when the engine brake torque output to the output shaft to correspond to the friction torque output in the state in which fuel is not supplied to the engine is smaller than the desired magnitude.

In the controller according to the aspect, the electronic control unit may be configured to perform control of causing the second electric motor to output a positive torque such that a magnitude of an engine brake torque generated in the output shaft in the state in which the supply of fuel to the engine is stopped is adjusted to a desired brake torque. The desired brake torque may be a torque which is smaller than the magnitude of the engine brake torque output from the output shaft by a friction torque which is output from the engine in the state in which the supply of fuel to the engine is stopped.

According to the controller of this aspect, since the magnitude of the engine brake torque output from the output shaft can be decreased, it is possible to adjust the engine brake torque output from the output shaft to a desired magnitude even when the engine brake torque output to the output shaft to correspond to the friction torque output in the state in which fuel is not supplied to the engine is equal to or greater than the desired magnitude.

In the controller according to the aspect, the electronic control unit may include a map of an engine brake equivalent torque which is set in advance based on a magnitude of a friction torque at an arbitrary rotation speed measured in the engine. The electronic control unit may be configured to read the engine brake equivalent torque corresponding to the rotation speed of the engine from the map and to set the engine brake equivalent torque.

According to the controller of this aspect, since an appropriate engine brake equivalent torque can be set depending on the rotation speed of the engine, it is possible to decrease a likelihood that the selectable one-way clutch will be in the unlocked state and to increase a frequency in which the selectable one-way clutch is maintained in the locked state.

In the controller according to the aspect, the electronic control unit may be configured to calculate a rotation speed of a shaft connected to the selectable one-way clutch. The electronic control unit may be configured to control the first electric motor such that the engine brake equivalent torque is output when the rotation speed of the shaft is negative.

According to the controller of this aspect, even when the friction torque generated when the supply of fuel to the engine is stopped is uneven, it is possible to determine the engine brake equivalent torque output from the first electric motor as a torque with an appropriate magnitude.

In the controller according to the aspect, the electronic control unit may be configured to set the engine brake equivalent torque to a fixed value based on a magnitude of a friction torque at an arbitrary rotation speed of the engine.

According to the controller of this aspect, since a sufficient engine brake equivalent torque can be set, it is possible to decrease a likelihood that the selectable one-way clutch will be in the unlocked state and to increase a frequency in which the selectable one-way clutch is maintained in the locked state.

According to the controller of the aspect, by controlling the first electric motor such that the engine brake equivalent torque with a magnitude sufficient to maintain the locked state in the selectable one-way clutch is output in the opposite direction to the direction of the negative torque generated in the engine when the hybrid vehicle travels in a state in which the supply of fuel to the engine is stopped in the overdrive state, the selectable one-way clutch can be maintained in the locked state using the first electric motor even when the engine does not output a positive torque. Accordingly, it is possible to prevent a driver from feeling discomfort due to an engagement delay or a busy feeling.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, exemplary embodiments of the present disclosure will be described with reference to the accompanying drawings. In all the drawings of the following embodiments, identical or equivalent elements will be referenced by the same reference signs.

Figure 1:
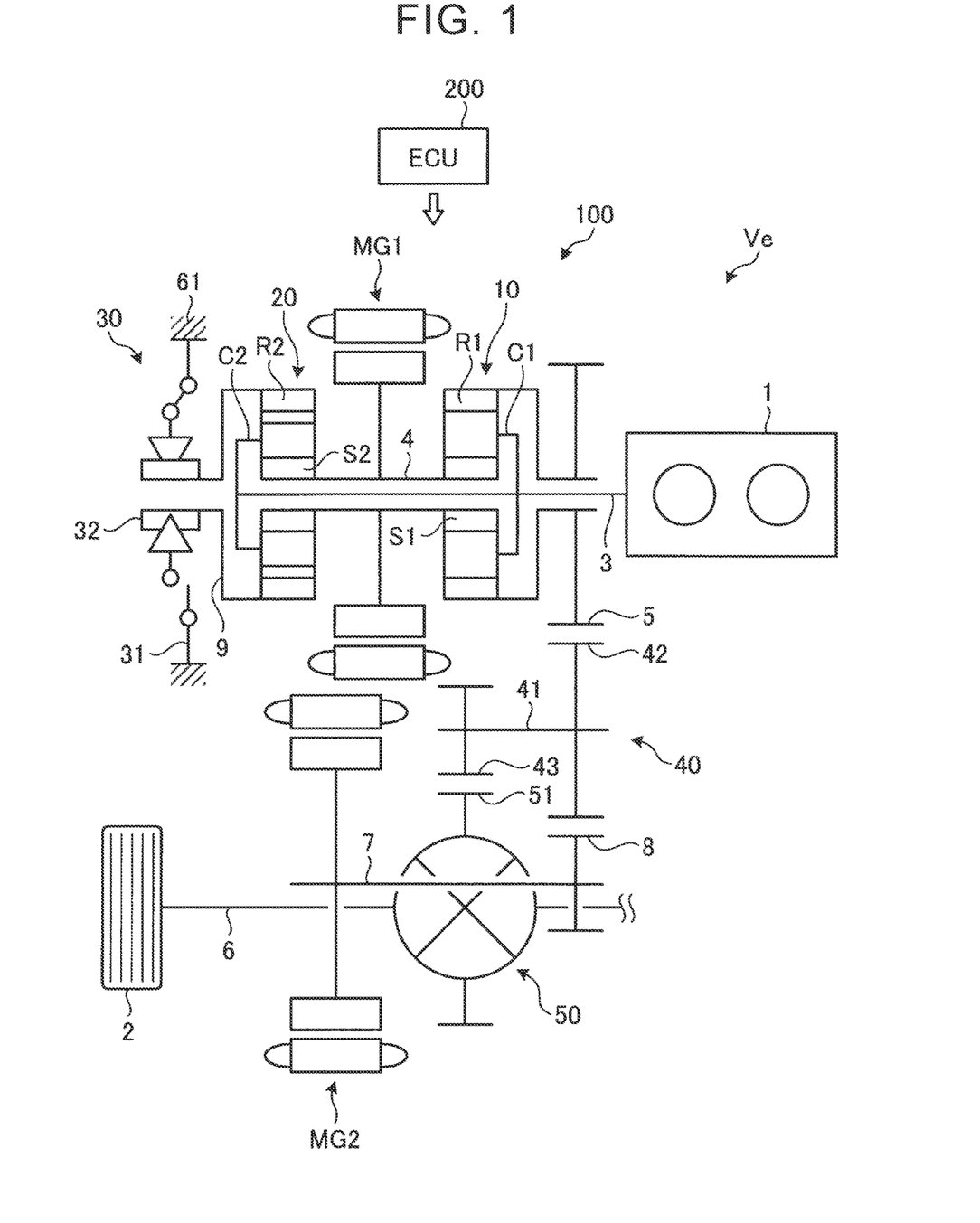
FIG. 1 is a skeleton diagram schematically illustrating an example of a hybrid vehicle equipped with a selectable one-way clutch according to a first embodiment of the present disclosure.

First, a controller for a hybrid vehicle according to a first embodiment of the present disclosure will be described. FIG. 1 is a skeleton diagram schematically illustrating an example of a hybrid vehicle equipped with a selectable one-way clutch according to the first embodiment.

As illustrated in FIG. 1, a hybrid (HV) vehicle Ve is a two-motor type hybrid vehicle with twin shafts including an engine 1, a first motor MG1 as a first electric motor, and a second motor MG2 as a second electric motor.

The engine 1 has a configuration of a power source known in the related art. Each of the first motor MG1 and the second motor MG2 is a known motor/generator having a motor function (powering) a power generator function (regeneration) and is electrically connected to a battery via an inverter (all of which are not illustrated).

A power train 100 of the HV vehicle Ve includes a first planetary gear mechanism 10, a second planetary gear mechanism 20, a selectable one-way clutch (SOWC) 30, a counter gear mechanism 40, and a differential gear mechanism 50. In the HV vehicle Ve, a power output from the engine 1 is split to the first motor MG1 side and the driving wheels 2 side by the first planetary gear mechanism 10 as a power split mechanism. When an engine torque is transmitted to the driving wheels 2, the SOWC 30 serves as a mechanism taking charge of an engine reaction force and thus the second planetary gear mechanism 20 as a gear shift unit serves as a speed-increasing gear. The first motor MG1 is made to function as a power generator by the mechanical power split to the first motor MG1 side and a battery is charged with electric power generated by the first motor MG1 or the electric power is supplied to the second motor MG2 via an inverter. The second motor MG2 may be made to function as a motor by the electric power generated by the first motor MG1.

A crank shaft of the engine 1 is connected to an input shaft 3. The input shaft 3 is disposed on the same axis as a rotation axis of the crank shaft. In the power train 100, the first planetary gear mechanism 10, the first motor MG1, the second planetary gear mechanism 20, and the SOWC 30 are arranged on the same axis as the input shaft 3. The second motor MG2 is disposed on an axis different from the rotation axis of the engine 1.

The first planetary gear mechanism 10 is constituted as a differential mechanism including a plurality of rotary elements and is constituted, for example, by a single pinion type planetary gear mechanism. The first planetary gear mechanism 10 includes a first sun gear S1, a first ring gear R1, and a first carrier C1 as three rotary elements. The first sun gear S1 is an externally toothed gear. The first ring gear R1 is an internally toothed gear disposed to be concentric with the first sun gear S1. The first carrier C1 holds a pinion gear engaging with the first sun gear S1 and the first ring gear R1 such that the pinion gear can rotate and revolve.

A rotor shaft 4 of the first motor MG1 is connected to the first sun gear S1 such that they are able to rotate together. The input shaft 3 is connected to the first carrier C1 to be rotatable together, and the engine 1 is connected thereto via the input shaft 3. An output gear 5 as an externally toothed gear transmitting an engine torque from the first planetary gear mechanism 10 to the driving wheels 2 is integrated with the first ring gear R1.

The output gear 5 engages with a counter-driven gear 42. The output gear 5 is connected to the differential gear mechanism 50 via the counter gear mechanism 40 including the counter-driven gear 42. The counter gear mechanism 40 includes a counter shaft 41 disposed parallel to the input shaft 3, the counter-driven gear 42 engaging with the output gear 5, and a counter-drive gear 43 engaging with a ring gear S1 of the differential gear mechanism 50. The counter-driven gear 42 and the counter-drive gear 43 are attached to the counter shaft 41 to be rotatable together. The driving wheels 2 are connected to the differential gear mechanism 50 via drive shafts 6 as right and left output shafts.

In the HV vehicle Ve, a torque output from the second motor MG2 can be added to a torque transmitted from the engine 1 to the driving wheels 2. The second motor MG2 includes a rotor shaft 7 which rotates together with the rotor. The rotor shaft 7 of the second motor MG2 is disposed parallel to the counter shaft 41. A reduction gear 8 engaging with the counter-driven gear 42 is attached to the rotor shaft 7 to be rotatable together.

The second planetary gear mechanism 20 is constituted as a differential mechanism including a plurality of rotary elements and is constituted, for example, by a double pinion type planetary gear mechanism. The second planetary gear mechanism 20 includes a second sun gear S2, a second ring gear R2, and a second carrier C2 as three rotary elements. The second sun gear S2 is an externally toothed gear. The second ring gear R2 is an internally toothed gear disposed to be concentric with the second sun gear S2. The second carrier C2 holds a first pinion gear and a second pinion gear such that the pinion gears can rotate and revolve. The first pinion gear engages with the second sun gear S2. The second pinion gear engages with the first pinion gear and the second ring gear R2.

A rotor shaft 4 of the first motor MG1 is connected to the second sun gear S2 to be rotatable together. The input shaft 3 is connected to the second carrier C2 to be rotatable together, and the engine 1 is connected thereto via the input shaft 3. That is, in the first planetary gear mechanism 10 and the second planetary gear mechanism 20, the first sun gear S1 and the second sun gear S2 rotate together, and the first carrier C1 and the second carrier C2 rotate together. A rotation-side member of the SOWC 30 is connected to the second ring gear R2 of the second planetary gear mechanism 20 via a selectable one-way clutch shaft (SOWC shaft) 9 as a coupling member. The SOWC 30 is disposed between the second ring gear R2 and a casing 61 as a fixed portion. Accordingly, the SOWC 30 is disposed in a power transmission path between the first motor MG1 and the first carrier C1 of the first planetary gear mechanism 10. The second ring gear R2 and the rotation-side member of the SOWC 30 are configured to rotate together via the SOWC shaft 9.

The SOWC 30 includes a pocket plate 31 as a fixed-side member and a notch plate 32 as a rotation-side member. The SOWC 30 includes a selectable plate as a switching member, a snap ring, and a strut as an engagement piece held in the pocket plate 31 (both of which are not illustrated). Accordingly, the SOWC 30 is configured to selectively switch between a partially engaged state in which a rotation direction of the second ring gear R2 is restricted to only one direction (hereinafter simply referred to as an engaged state) and a disengaged state in which the second ring gear R2 can rotate in both directions. The engaged state and the disengaged state can be detected, for example, by disposing a sensor in a selector plate or the like.

When the SOWC 30 is in the engaged state, the selector plate is opened and the strut rises by an operation of a spring, and the strut is inserted into a notch as an engagement recessed portion (both of which are not illustrated). Accordingly, in the SOWC 30, rotation in a negative direction as a predetermined one direction is permitted and rotation in a positive direction as the opposite direction is restricted. In the first embodiment, when the SOWC 30 is in the engaged state, rotation in the negative direction of the second ring gear R2 is permitted and rotation in the positive direction as the opposite direction is restricted. The positive direction is the same direction as the rotation direction of the crank shaft of the engine 1. The negative direction is the opposite direction to the positive direction. In this specification, in the SOWC 30 in the engaged state, a state in which rotation in the positive direction is restricted is referred to as a "locked state" and a state in which rotation in the negative direction is permitted is referred to as an "unlocked state." The SOWC 30 is disposed in a transaxle case (not illustrated).

The HV vehicle Ve according to the first embodiment has a HV driving mode and an EV driving mode. The EV driving mode is a driving mode in which the HV vehicle travels using the second motor MG2 as a power source. The EV driving mode is selected, for example, in driving conditions of a relatively low vehicle speed or a low load. On the other hand, the HV driving mode is a driving mode in which the HV vehicle travels using the engine 1 as a power source. In the HV driving mode, the second motor MG2 can also be used as a power source. The HV driving mode includes two driving modes of a Toyota hybrid system (THS) driving mode and an overdrive (OD)-locked driving mode.

The THS driving mode is a driving mode in which a reaction force with respect to the power of the engine 1 is generated by the first motor MG1. That is, the THS driving mode is a driving mode in which the HV vehicle travels with the SOWC 30 in the disengaged state. The second ring gear R2 is permitted to rotate in both directions. At this time, the first motor MG1 outputs a reaction torque to an engine torque output from the engine 1 and functions as a reaction force receiver. The engine torque is transmitted from the first ring gear R1 to the driving wheels 2 via the counter-drive gear 43 and generates a driving force for driving the HV vehicle Ve. In the THS driving mode, a transmission gear ratio of the first planetary gear mechanism 10 and the second planetary gear mechanism 20 can be continuously changed by changing a rotation speed of the first motor MG1, and the THS driving mode is also referred to as CVT control.

The OD-locked driving mode is a driving mode in which the rotation speed of the engine 1 is increased and is output from the first ring gear R1 of the first planetary gear mechanism 10 to the counter-drive gear 43 by restricting or permitting rotation of the rotary element (the second ring gear R2) of the second planetary gear mechanism 20. For example, the SOWC 30 is a braking mechanism that switches between the THS driving mode and the OD-locked driving mode in the HV driving mode by restricting or permitting rotation of the rotary element (the second ring gear R2) of the second planetary gear mechanism 20.

The units of the HV vehicle Ve are controlled by an ECU 200 as a control unit constituting the controller. The ECU 200 is physically an electronic circuit that includes a known microcomputer including a central processing unit (CPU), a random access memory (RAM), a read only memory (ROM), and an interface as main elements. The ECU 200 performs an arithmetic operation using data input to the RAM and data stored in advance in the ROM or the like, and outputs the operation result as a command signal. The functions of the ECU 200 are embodied by causing the CPU to load and execute a program stored in the ROM into the RAM and operating various units of the HV vehicle Ve based on the control of the CPU and by reading data from the RAM or the ROM as a recording unit and writing data to the RAM.

That is, detection signals such as a vehicle speed, an accelerator opening level, an engine rotation speed, an estimated output torque, rotation speeds and torques of the first motor MG1 and the second motor MG2, and an operation state of the SOWC 30 are input as data to the ECU 200. Depending on the operation result based on input data, a command signal for controlling the engine rotation speed of the engine 1, the first motor MG1 and the second motor MG2, or the SOWC 30 is output from the ECU 200.

Figure 2:
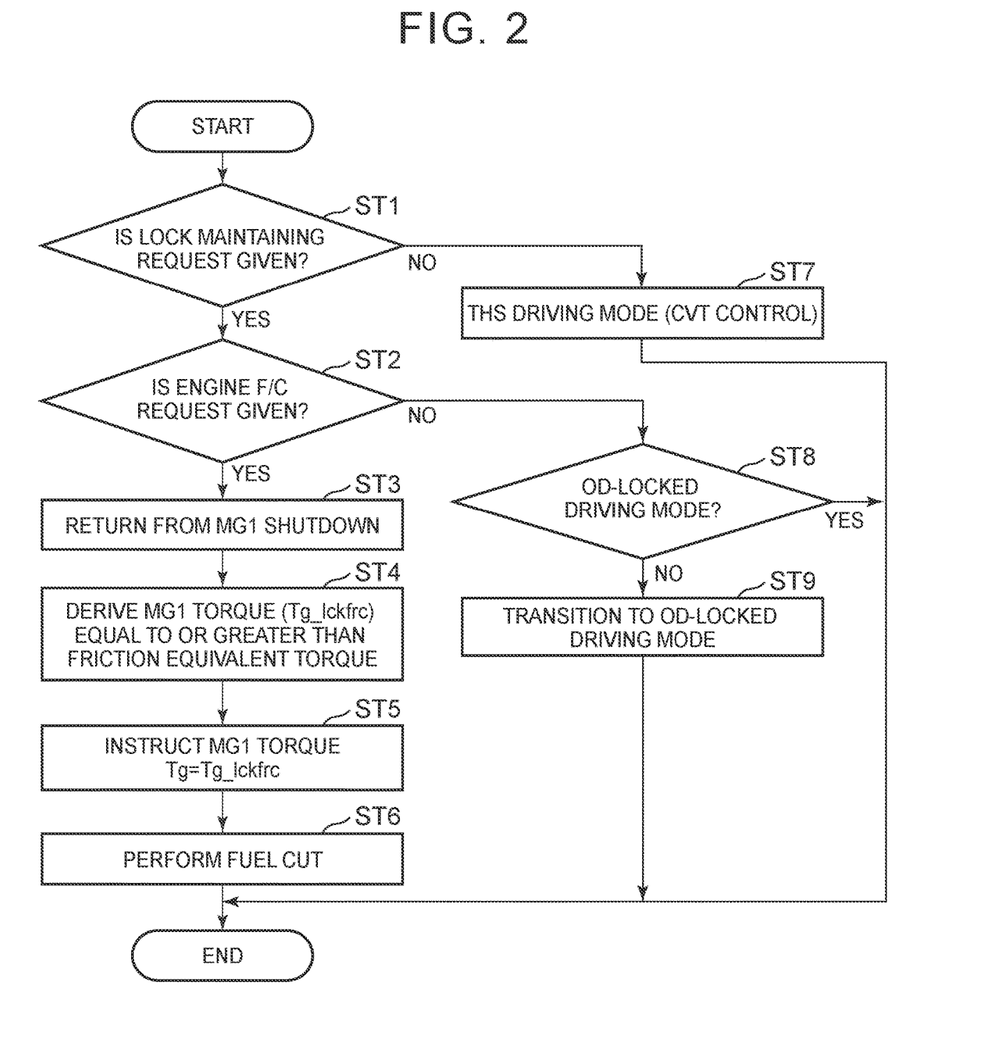
FIG. 2 is a flowchart illustrating a control method which is performed by a controller for the hybrid vehicle according to the first embodiment of the present disclosure.
Figure 3:
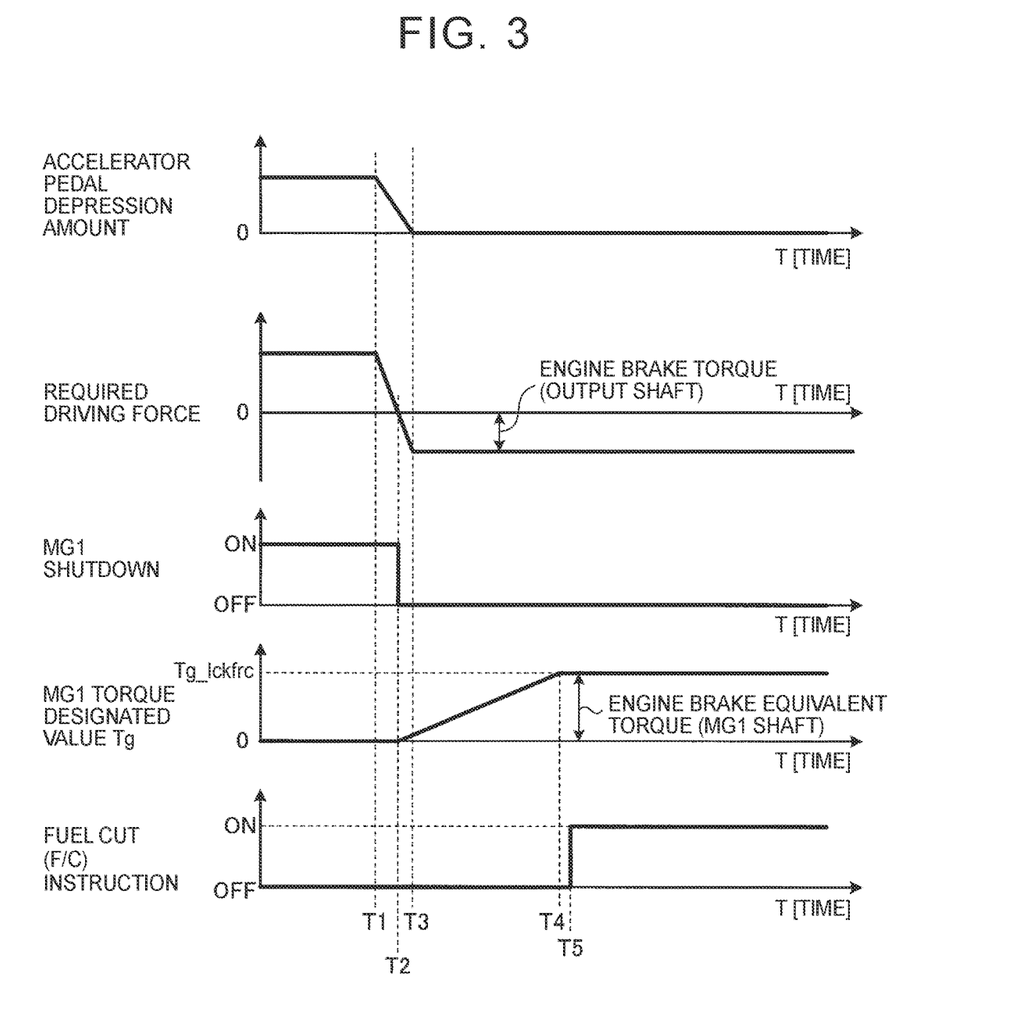
FIG. 3 is a timing chart illustrating a control method which is performed by the controller for the hybrid vehicle according to the first embodiment of the present disclosure.

A control method of the HV vehicle Ve having the above-mentioned configuration will be described below. FIG. 2 is a flowchart illustrating a control method which is performed by the controller for the HV vehicle Ve according to the first embodiment. FIG. 3 is a timing chart illustrating the control method according to the first embodiment. At a time point at which a control process according to the first embodiment is started, it is assumed that the SOWC 30 is in the engaged state and that rotation in the negative direction in the SOWC 30 in the engaged state is in the unlocked state and rotation in the positive direction in the locked state.

As illustrated in FIG. 2, in Step ST1, the ECU 200 determines whether an instruction to continue to maintain the OD-locked driving mode, that is, a lock maintaining request, has been made in response to a vehicle request or a driver request. Here, as the lock maintaining request, a lock maintaining request based on the vehicle request or a lock maintaining request based on the driver request which is known in the related art can be employed. Specifically, an example of the lock maintaining request based on the driver request is selection of a lock maintaining mode by a driver. Examples of the lock maintaining request based on the vehicle request include lock maintenance for a predetermined time for decreasing a busy feeling and a lock maintaining condition satisfied by an input of a brake operation for a predetermined time. In this case, for example, a flag of the lock maintaining request is set up in the ECU 200, and whether the lock maintaining request for maintaining the OD-locked driving mode has been made is determined using the flag. When the ECU 200 determines that the flag of the lock maintaining request is set up in Step ST1 (YES in Step ST1), the control process transitions to Step ST2.

In Step ST2, the ECU 200 determines whether a fuel-cut request (an F/C request) which is a request for stopping supply of fuel to the engine 1 has been input. Examples of the input of the F/C request to the engine 1 include an input of a detection signal of a state in which an accelerator pedal is returned by a driver, that is, an input of a detection signal indicating that the accelerator opening level decreases. In the timing chart illustrated in FIG. 3, the accelerator is returned by the driver for a time between time points T1 to T3 and the accelerator pedal depression amount decreases. The ECU 200 decreases a driving force (a required driving force) required as a driving force output from the drive shafts 6 as an output shaft from a positive torque to a negative torque depending on the decrease in accelerator pedal depression amount. The ECU 200 determines that the F/C request has been made at time point T2 at which the required driving force is zero. At time point T3 (?T2_ at which the accelerator pedal depression amount is zero, the required driving force is output as an engine brake torque which is a negative torque to the drive shafts 6.

When the ECU 200 determines that the F/C request is given in Step ST2 illustrated in FIG. 2 (YES in Step ST2), the control process transitions to Step ST3. In Step ST3, the ECU 200 performs control of returning the first motor MG1 from a shutdown state. The shutdown state of the first motor MG1 is a state in which the first motor MG1 is not supplied with power and the first motor MG1 is freely rotatable. In the timing chart illustrated in FIG. 3, at time point T2 at which the F/C request is given, an MG1 shutdown state is switched from ON to OFF by the ECU 200. Accordingly, power is supplied to the first motor MG1 and the first motor MG1 is returned from the shutdown state. Thereafter, the control process transitions to Step ST4 illustrated in FIG. 2.

In Step ST4, the ECU 200 sets a positive torque Tg (hereinafter referred to as an engine brake equivalent torque Tg_lckfrc) with a magnitude by which the first motor MG1 can resist a friction torque such that the SOWC 30 is not in the unlocked state due to the friction torque which is a negative torque generated in the engine 1 when the engine 1 is subjected to fuel cut.

A method of setting the engine brake equivalent torque Tg_lckfrc which is output from the first motor MG1 will be described below. In the first embodiment, the friction torque at an arbitrary rotation speed of the engine 1 is measured, and a necessary and sufficient torque in which a rotation speed of the SOWC shaft (an SOWC shaft rotation speed Nso) is not negative is calculated in consideration of individual differences of the engine 1 in advance and is stored as a map in the recording unit of the ECU 200. The necessary and sufficient torque is a torque in which the SOWC 30 can be maintained in the locked state by the first motor MG1 and an amount of power consumed to drive the first motor MG1 is as small as possible. When the SOWC shaft rotation speed Nso is negative, this means that the rotation direction of the SOWC 30 is the negative direction.

The ECU 200 extracts the engine brake equivalent torque Tg_lckfrc from the map depending on the engine rotation speed of the engine 1 during traveling of the HV vehicle Ve. Thereafter, the control process transitions to Step ST5.

In Step ST5, the ECU 200 outputs a command signal instructing the first motor MG1 to output the engine brake equivalent torque Tg_lckfrc. Here, the ECU 200 controls the first motor MG1 such that the engine brake equivalent torque Tg_lckfrc extracted from the map in Step ST4 is output. Accordingly, the first motor MG1 outputs the engine brake equivalent torque Tg_lckfrc in the positive direction which is the opposite direction to the direction of the friction torque generated in the engine 1 in the fuel-cut state. In the timing chart illustrated in FIG. 3, at time point T2, the ECU 200 instructs the first motor MG1 to output the engine brake equivalent torque Tg_lckfrc. Thereafter, the first motor MG1 increases the torque to be output and outputs the engine brake equivalent torque Tg_lckfrc at time point T4. Thereafter, the control process transitions to Step ST6.

In Step ST6, the ECU 200 outputs a command signal for performing fuel cut (F/C) to the engine 1. Accordingly, the fuel cut is performed in the engine 1 and a friction torque which is a negative torque is output from the engine 1. In the timing chart illustrated in FIG. 3, at time point T5 at which a fuel cut (F/C) instruction is turned on, the fuel cut is performed in the engine 1 and the friction torque which is the negative torque is output from the engine 1. The friction torque of the engine 1 is output as an engine brake torque in the drive shafts 6. Thereafter, the ECU 200 ends the process for the HV vehicle Ve.

When the ECU 200 determines that the lock maintaining request has not been made in Step ST1 (NO in Step ST1), the control process transitions to Step ST7. In Step ST7, the ECU 200 controls the SOWC 30 such that the SOWC is switched to the disengaged state and switches the driving mode of the HV vehicle Ve to the THS driving mode (the CVT control). Thereafter, the ECU 200 ends the process for the HV vehicle Ve.

When the ECU 200 determines that the F/C request for the engine 1 has not been input in Step ST2 (NO in Step ST2), the control process transitions to Step ST8. In Step ST8, the ECU 200 determines whether the driving mode of the HV vehicle Ve is the OD-locked driving mode.

When the ECU 200 determines that the driving mode of the HV vehicle Ve is the OD-locked driving mode in Step ST8 (YES in Step ST8), the process for the HV vehicle Ve is ended.

On the other hand, when the ECU 200 determines that the driving mode of the HV vehicle Ve is the THS driving mode in Step ST8 (NO in Step ST8), the control process transitions to Step ST9. When the HV vehicle Ve is in the THS driving mode, the SOWC 30 is in the disengaged state. In Step ST9, the ECU 200 controls the SOWC 30 such that the SOWC is switched to the engaged state and the driving mode of the HV vehicle Ve is switched to the OD-locked driving mode. Thereafter, the ECU 200 ends the process for the HV vehicle Ve.

Figure 4:
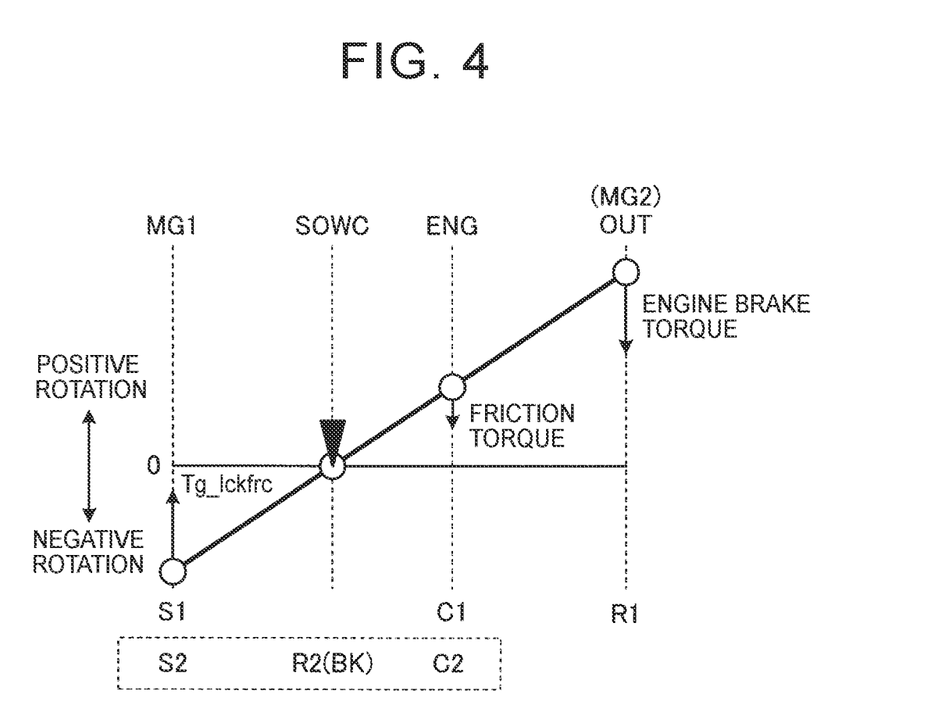
FIG. 4 is a collinear diagram illustrating an OD-locked driving mode in the hybrid vehicle according to the first embodiment of the present disclosure.

The engine brake equivalent torque Tg_lckfrc which is output from the first motor MG1 when the engine 1 is subjected to the fuel cut in the above-mentioned control method for the HV vehicle Ve will be described below. FIG. 4 is a collinear diagram illustrating the OD-locked driving mode of the HV vehicle Ve according to the first embodiment.

As illustrated in FIG. 4, in the lock maintaining state in which the OD-locked driving mode is maintained, the SOWC 30 is in the engaged state. The SOWC 30 acts as a braking mechanism for rotation in the positive direction in the second ring gear R2. The second ring gear R2 is restricted to rotate in the positive direction and is permitted to rotate in the negative direction.

In the OD-locked driving mode, while the engine 1 outputs the positive torque, rotation of the second ring gear R2 of the second planetary gear mechanism 20 is restricted. Accordingly, the rotation speed of the engine 1 increases and the torque is output to the driving wheels 2 via the counter gear mechanism 40 and the drive shaft 6 from the first ring gear R1 of the first planetary gear mechanism 10.

Here, negative rotation is permitted in the SOWC 30 and the SOWC shaft 9. Accordingly, when the first motor MG1 is in the shutdown state and the fuel cut is performed on the engine 1 to output a friction torque from the engine 1, there is a possibility that the SOWC 30 will rotate in the negative direction and the SOWC shaft rotation speed Nso will have a negative value. Therefore, the ECU 200 returns the first motor MG1 from the shutdown state, and outputs the engine brake equivalent torque Tg_lckfrc with a magnitude by which the SOWC 30 can maintain the locked state in the positive direction against the friction torque. Accordingly, since the SOWC shaft rotation speed Nso can be maintained not to be less than zero even in the state in which the engine 1 does not output a positive torque, the SOWC 30 can be maintained in the locked state.

As described above, when a friction torque is output from the engine 1, the friction torque is output as an engine brake torque from the drive shafts 6 as the output shaft. When the first motor MG1 is in the shutdown state, the magnitude of the engine brake torque output from the drive shaft 6 becomes a magnitude corresponding to the friction torque of the engine 1.

When the magnitude of the engine brake torque output from the drive shafts 6 is set to be greater than the magnitude of the engine brake torque corresponding to the friction torque of the engine 1, the ECU 200 adjusts the torque output from the first motor MG1 or the second motor MG2.

Specifically, for example, the ECU 200 performs control of outputting a negative torque which acts in the negative direction from the second motor MG2. When a negative torque is output from the second motor MG2, the negative torque output from the second motor MG2 is added to the negative torque output from the drive shafts 6 based on the friction torque of the engine 1. By causing the ECU 200 to adjust the negative torque output from the second motor MG2, a desired engine brake torque with a magnitude greater than the magnitude of the negative torque based on the friction torque of the engine 1 can be output from the drive shafts 6.

For example, the ECU 200 performs control of outputting a positive torque acting in the positive direction from the first motor MG1. When a positive torque is output from the first motor MG1, the positive torque from the first motor MG1 acts as a negative torque on the drive shafts 6. Accordingly, the negative torque acting on the drive shafts 6 depending on the positive torque output from the first motor MG1 is added to the negative torque output from the drive shafts 6 depending on the friction torque of the engine 1. By causing the ECU 200 to adjust the positive torque output from the first motor MG1, a desired engine brake torque with a magnitude greater than the magnitude of the negative torque depending on the friction torque of the engine 1 can be output from the drive shafts 6.

As described above, when the engine 1 is subjected to fuel cut in the OD-locked driving mode, the first motor MG1 outputs the engine brake equivalent torque Tg_lckfrc to maintain the locked state of the SOWC 30. When the magnitude of the engine brake torque output from the drive shafts 6 is increased with an increase in the positive torque Tg output from the first motor MG1, the first motor MG1 outputs the positive torque Tg which is greater than the engine brake equivalent torque Tg_lckfrc determined as described above. Since it is possible to decrease a likelihood that the SOWC 30 will be switched from the locked state to the unlocked state by the positive torque Tg output from the first motor MG1 and a frequency in which the locked state is released decreases, it is possible to reduce a busy feeling.

On the other hand, when the magnitude of the engine brake output from the drive shafts 6 is set to be smaller than the magnitude of the engine brake torque based on the friction torque of the engine 1, the ECU 200 adjusts the torque to be output from the second motor MG2. Specifically, for example, the ECU 200 performs control of outputting a positive torque acting in the positive direction from the second motor MG2. Accordingly, the positive torque output from the second motor MG2 is added to the negative torque output from the drive shafts 6 based on the friction torque of the engine 1. A desired engine brake torque with a magnitude smaller than the magnitude of the torque based on the friction torque of the engine 1 is output from the drive shafts 6.

According to the above-mentioned first embodiment of the present disclosure, when a friction torque is output from the engine 1 in the OD-locked driving mode, a torque acts on the SOWC 30 such that it is switched to the locked state by outputting the engine brake equivalent torque Tg_lckfrc from the first motor MG1. Accordingly, when the HV vehicle Ve is in the OD-locked driving mode, it is possible to decrease a frequency in which the rotation speed of the SOWC 30 (the SOWC shaft rotation speed Nso) has a negative value due to an unexpected fluctuation of the friction torque of the engine 1. Accordingly, a likelihood that the SOWC shaft rotation speed Nso has a negative value and the SOWC 30 is switched to the unlocked state and then is returned to the locked state decreases. As a result, it is possible to prevent a driver from feeling discomfort due to an engagement delay or a busy feeling.

In the SOWC 30 in which the strut engages with the notch in the first embodiment, the likelihood that the unlocked state and the locked state are repeated decreases and it is thus possible to prevent noise from being repeatedly generated due to collision of the strut with the inner surface of the notch in the SOWC 30 when the unlocked state is switched to the locked state.

Another example of the method of setting the engine brake equivalent torque Tg_lckfrc output from the first motor MG1 and the control method according to the first embodiment will be described below.

A method of setting the engine brake equivalent torque Tg_lckfrc according to a first modified example of the first embodiment is a method of adjusting the engine brake equivalent torque Tg_lckfrc by performing feedback control based on the SOWC shaft rotation speed Nso to decrease the frequency in which the SOWC shaft rotation speed Nso has a negative value as much as possible. That is, the ECU 200 detects the SOWC shaft rotation speed Nso normally using a predetermined method and performs control of increasing the engine brake equivalent torque Tg_lckfrc to be output on the first motor MG1 at the time point at which it is determined that the detected SOWC shaft rotation speed Nso has a negative value. An example of the method of detecting the SOWC shaft rotation speed Nso using the ECU 200 is a method of calculating the SOWC shaft rotation speed Nso based on data of the rotation speed of the first motor MG1 and the rotation speed of the second motor MG2 which are input to the ECU 200. A method of providing a rotation speed sensor in the SOWC 30 and detecting and supplying the SOWC shaft rotation speed Nso to the ECU 200 may be employed.

A method of setting the engine brake equivalent torque Tg_lckfrc according to a second modified example of the first embodiment is a method in which the setting method according to the first embodiment and the setting method according to the first modified example are combined. That is, first, the ECU 200 reads the engine brake equivalent torque Tg_lckfrc output from the first motor MG1 for each engine rotation speed from a predetermined map of a necessary and sufficient engine brake equivalent torque Tg_lckfrc in which the SOWC shaft rotation speed Nso does not have a negative value. Then, the ECU 200 detects the SOWC shaft rotation speed Nso normally and performs control of increasing the engine brake equivalent torque Tg_lckfrc output from the first motor MG1 at a time point at which the SOWC shaft rotation speed Nso has a negative value. Accordingly, even when the state of the engine 1 degrades over time, the frequency in which the SOWC shaft rotation speed Nso has a negative value in the OD-locked driving mode can be decreased and it is thus possible to increase a frequency in which the SOWC 30 is in the locked state.

A method of setting the engine brake equivalent torque Tg_lckfrc according to a third modified example of the first embodiment is a method of setting the engine brake equivalent torque Tg_lckfrc sufficient to cause the SOWC shaft rotation speed Nso not to have a negative value to a fixed value regardless of the rotation speed of the engine 1. That is, when the engine 1 outputs a friction torque in the OD-locked driving mode, the ECU 200 performs control of normally outputting a fixed engine brake equivalent torque Tg_lckfrc on the first motor MG1. Accordingly, since the time in which the SOWC shaft rotation speed Nso has a negative value can be greatly decreased in the OD-locked driving mode, it is possible to increase the time in which the SOWC 30 is in the locked state.

Figure 5:
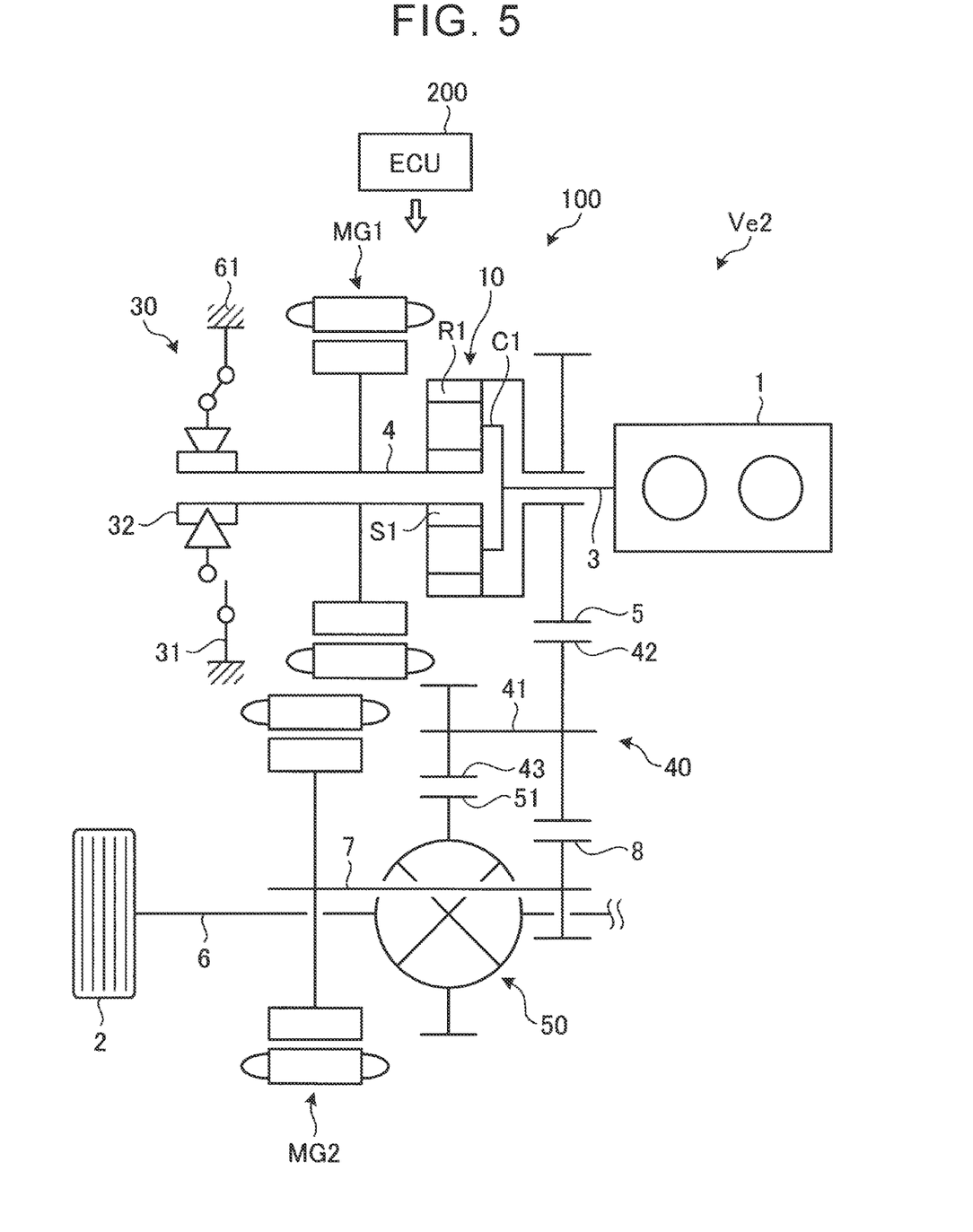
FIG. 5 is a skeleton diagram schematically illustrating an example of a hybrid vehicle equipped with a selectable one-way clutch according to a second embodiment of the present disclosure.

A controller for a hybrid vehicle according to a second embodiment of the present disclosure will be described below. FIG. 5 is a skeleton diagram schematically illustrating an example of a hybrid vehicle equipped with a selectable one-way clutch according to the second embodiment of the present disclosure.

As illustrated in FIG. 5, a HV vehicle Ve2 which is the hybrid vehicle according to the second embodiment is not provided with the second planetary gear mechanism 20, unlike the first embodiment. That is, the SOWC 30 is disposed between the first sun gear S1 connected to the first motor MG1 and a casing 61 as a fixed portion.

The HV vehicle Ve2 has an HV driving mode and an EV driving mode. The HV driving mode includes two driving modes of a THS driving mode and an MG1-locked driving mode. The SOWC 30 is, for example, a braking mechanism that switches between the THS driving mode and the MG1-locked driving mode in the HV driving mode by restricting or permitting rotation of the rotary element (the first sun gear S1) of the first planetary gear mechanism 10.

The THS driving mode is a driving mode in which the HV vehicle travels with the SOWC 30 set to the disengaged state, and rotation in both directions of the first sun gear S1 is permitted. The ECU 200 causes the first motor MG1 to output a reaction torque to the engine torque and to function as a reaction force receiver. The engine torque is transmitted from the first ring gear R1 to the driving wheels 2 via the counter gear mechanism 40 and the drive shaft 6 and generates a driving force for driving the HV vehicle Ve2. The MG1-locked driving mode is a driving mode in which the HV vehicle travels with the SOWC 30 set to the engaged state.

Figure 6:
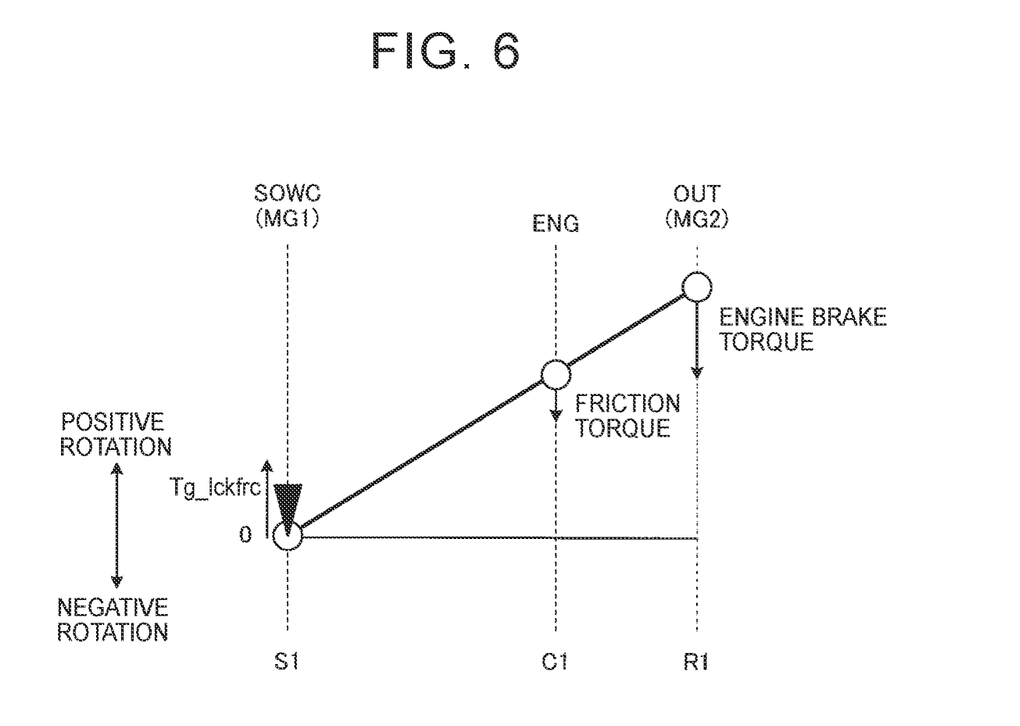
FIG. 6 is a collinear diagram illustrating an MG1-locked driving mode in the hybrid vehicle according to the second embodiment of the present disclosure.

FIG. 6 is a collinear diagram illustrating the MG1-locked driving mode in the hybrid vehicle according to the second embodiment. As illustrated in FIG. 6, in the MG1-locked driving mode, the overdrive state is achieved by restricting the rotation in the positive direction of the first sun gear S1, the rotation speed of the engine 1 increases, and the rotation of the engine 1 is output from the first ring gear R1 of the first planetary gear mechanism 10 to the counter gear mechanism 40.

When fuel cut is instructed to the engine 1 in the MG1-locked driving mode, the ECU 200 controls the first motor MG1 such that a positive torque of an engine brake equivalent torque Tg_lckfrc is output. Accordingly, since the torque output from the first motor MG1 acts in the direction in which the rotation in the SOWC 30 is positive, the locked state of the SOWC 30 can be maintained even in a state in which a friction torque is generated.

When an engine brake torque output from the drive shafts 6 as an output shaft is adjusted in this state, the ECU 200 adjusts the torque output from the second motor MG2. That is, by outputting a negative torque from the second motor MG2, the magnitude of the engine brake torque output from the drive shafts 6 is increased. On the other hand, by outputting a positive torque from the second motor MG2, the magnitude of the engine brake torque is decreased. The configuration is otherwise the same as in the first embodiment.

According to the second embodiment, even when the HV vehicle Ve2 is in the MG1-locked driving mode, the same advantages as in the first embodiment can be achieved.

While embodiments of the present disclosure have been specifically described above, The above-mentioned embodiments can be modified in various forms based on the technical idea of the present disclosure. For example, numerical values described in the above-mentioned embodiments are only examples and other numerical values may be used if necessary.

What is claimed is:

1. A controller for a hybrid vehicle, the hybrid vehicle including an engine, a first electric motor, a second electric motor, a power split mechanism, and a selectable one-way clutch, the second electric motor being disposed on an axis different from an axis of the engine, the second electric motor being connected to an output shaft of driving wheels of the hybrid vehicle to output a power to the output shaft, the power split mechanism including a carrier, a ring gear, and a sun gear, the carrier being connected to the engine, the sun gear being connected to the first electric motor, the ring gear being connected to the output shaft to output a torque to the output shaft, the power split mechanism being configured to split a power output from the engine to the first electric motor side and the output shaft side, the selectable one-way clutch being configured to selectively switch between an engaged state in which an unlocked state in which rotation in a predetermined one direction is permitted and a locked state in which rotation in the opposite direction to the predetermined one direction is prohibited occur and a disengaged state in which rotation in the predetermined one direction and the opposite direction are permitted, the selectable one-way clutch being disposed to be connected to a power transmission path between the first electric motor and the carrier or the between first electric motor and a fixed portion, the hybrid vehicle being configured to increase and transmit a rotation speed of the engine to the output shaft to drive the output shaft in an overdrive state when the selectable one-way clutch is in the engaged state, the controller comprising:

an electronic control unit configured to control the first electric motor such that an engine brake equivalent torque with a magnitude sufficient to maintain the locked state of the selectable one-way clutch is output in a direction opposite to a direction of a negative torque which is generated in the engine when the hybrid vehicle travels in a state in which supply of fuel to the engine is stopped in the overdrive state.

2. The controller according to claim 1, wherein the electronic control unit is configured to perform at least one of control of increasing a magnitude of a positive torque output from the first electric motor and control of increasing a magnitude of a negative torque output from the second electric motor such that a magnitude of an engine brake torque generated in the output shaft in the state in which the supply of fuel to the engine is stopped is adjusted to a desired brake torque, the desired brake torque being a torque which is greater than the magnitude of the engine brake torque output from the output shaft by a friction torque which is output from the engine in the state in which the supply of fuel to the engine is stopped.

3. The controller according to claim 1, wherein the electronic control unit is configured to perform control of causing the second electric motor to output a positive torque such that a magnitude of an engine brake torque generated in the output shaft in the state in which the supply of fuel to the engine is stopped is adjusted to a desired brake torque, the desired brake torque being a torque which is smaller than the magnitude of the engine brake torque output from the output shaft by a friction torque which is output from the engine in the state in which the supply of fuel to the engine is stopped.

4. The controller according to claim 1, wherein the electronic control unit includes a map of an engine brake equivalent torque which is set in advance based on a magnitude of a friction torque at an arbitrary rotation speed measured in the engine, and the electronic control unit is configured to read the engine brake equivalent torque corresponding to the rotation speed of the engine from the map and to set the engine brake equivalent torque.

5. The controller according to claim 1, wherein the electronic control unit is configured to detect a rotation speed of a shaft connected to the selectable one-way clutch, and the electronic control unit is configured to control the first electric motor such that the engine brake equivalent torque is output when the rotation speed of the shaft is negative.

6. The controller according to claim 1, wherein the electronic control unit is configured to set the engine brake equivalent torque to a fixed value based on a magnitude of a friction torque at an arbitrary rotation speed of the engine.

* * * * *